United States Patent [19]
Kato et al.

[11] Patent Number: 6,157,837
[45] Date of Patent: *Dec. 5, 2000

[54] MOBILE COMMUNICATION SYSTEM, NETWORK AND MOBILE STATION

[75] Inventors: Yasuhiro Kato; Akihiro Maebara; Ichiro Okajima, all of Kanagawa; Kazuo Sugiyama, Chiba; Koji Sasada, Tokyo, all of Japan

[73] Assignee: Ntt Mobile Communications Network Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,480

[22] Filed: Jan. 21, 1997

[30] Foreign Application Priority Data

Jan. 23, 1996 [JP] Japan ................................. 8-009387
Feb. 2, 1996 [JP] Japan ................................. 8-017805

[51] Int. Cl.⁷ .................................................. H04Q 7/20
[52] U.S. Cl. ......................... 455/437; 455/436; 455/442; 455/512; 455/513; 455/525
[58] Field of Search .................................... 455/422, 436, 455/437, 438, 442, 575, 525, 439, 512, 513, 62, 509; 370/331, 332

[56] References Cited

U.S. PATENT DOCUMENTS

| | | |
|---|---|---|
| 4,475,010 | 10/1984 | Huensch et al. . |
| 5,093,926 | 3/1992 | Sasuta . |
| 5,117,502 | 5/1992 | Onoda et al. ............................ 455/33.1 |
| 5,257,402 | 10/1993 | Crisier .................................... 455/33.2 |
| 5,267,261 | 11/1993 | Blakeney, II et al. ................... 455/437 |
| 5,276,908 | 1/1994 | Koohgoli et al. ......................... 455/62 |
| 5,327,575 | 7/1994 | Menich et al. . |
| 5,371,780 | 12/1994 | Amitay ..................................... 379/58 |
| 5,428,816 | 6/1995 | Barnett et al. .......................... 455/33.2 |
| 5,471,670 | 11/1995 | Hess et al. ............................. 455/33.2 |
| 5,491,837 | 2/1996 | Haartsen .................................. 455/62 |
| 5,509,051 | 4/1996 | Barnett et al. ............................ 379/59 |
| 5,530,917 | 6/1996 | Andersson et al. ..................... 455/54.1 |
| 5,555,445 | 9/1996 | Booth ..................................... 455/33.2 |
| 5,594,718 | 1/1997 | Weaver, Jr. et al. ..................... 455/437 |
| 5,594,943 | 1/1997 | Balachandran ......................... 455/33.2 |
| 5,634,192 | 5/1997 | Meche et al. ........................... 455/437 |
| 5,649,291 | 7/1997 | Tayloe .................................... 370/332 |
| 5,701,585 | 12/1997 | Kallin et al. ............................ 455/436 |
| 5,774,809 | 6/1998 | Tuutijarvi et al. ...................... 455/437 |

FOREIGN PATENT DOCUMENTS

| | | |
|---|---|---|
| 2-249326 | 10/1990 | Japan . |
| 4-006919 | 1/1992 | Japan . |
| 5-284562 | 10/1993 | Japan . |
| 6-069862 | 3/1994 | Japan . |
| 6-303662 | 10/1994 | Japan . |
| WO 92/10914 | 6/1992 | WIPO . |
| WO 95/04423 | 2/1995 | WIPO . |

Primary Examiner—Nay Maung
Assistant Examiner—Quochien B. Vuong
Attorney, Agent, or Firm—Brinks Hofer Gilson & Lione

[57] ABSTRACT

An object of the present invention is to reduce the control time required when a channel handover is performed in a mobile communication system. The conventional system has such shortcomings that a long time is required for re-designating a channel when a channel handover procedure results in failure. Particularly, in the common access type system, there is such a problem that since a channel handover is required to be performed several times during a channel handover procedure, an extra time is required for performing the handover procedure. The present invention has a plurality of base stations for covering the service area, and a mobile station for performing a communication with the base stations through radio channels. Here, the present invention is characterized in that the base stations notify the mobile station of a plurality of candidates when the mobile station performs a handover procedure, thereby improving the problem inherent in the conventional system that a single candidate is notified when a channel handover procedure is performed. Therefore, the present invention makes it possible to change the channel to the next candidate channel at high speed when the previous channel handover procedure results in failure.

20 Claims, 12 Drawing Sheets

MOBILE COMMUNICATION SYSTEM, NETWORK AND MOBILE STATION

BACKGROUND OF THE INVENTION

The present invention relates to a mobile communication system, a network and a mobile station, for performing a radio communication in a radio zone. Particularly, it relates to a mobile communication system, a network and a mobile station, capable of switching a radio zone or a channel(i.e. handover) at a high speed.

Generally, in a mobile communication system, a base station selects a single radio zone and a single radio channel and notifies a mobile station of the selected radio zone and radio channel when the mobile station switches a radio zone. Thereafter, the mobile station switches the channel to the notified radio channel.

Incidentally, in a handover control procedure of a radio channel, a handover to the notified radio channel is sometimes impossible to be performed due to effect of interference, etc. In such a case, it is necessary for the mobile station to receive a notice of a candidate radio zone and a candidate radio channel once again from the same base station. That is, in case a handover procedure of a radio zone results in failure, the mobile station must receive a notice of another candidate again from the base station each time a handover procedure results in failure, until a handover procedure is performed successfully. For those reasons, the procedure for switching a channel is sometimes delayed in the conventional mobile communication system.

Also, in a PDC (Personal Digital Cellular) type mobile communication system which is now commercially served in Japan, a base station periodically notifies a mobile station of a representative channel of a common control channel for peripheral zones. Upon receipt of a notice, the mobile station switches the channel to the representative channel of the handover target zone first. Then, the mobile station obtains information on channels usable in the handover target zone, through the representative channel. Thereafter, the mobile station switches the channel within the target zone.

As discussed above, in the PDC type common control channel, the mobile station must perform a channel handover procedure twice; the first is a channel handover to a representative channel so that a radio zone handover can be performed through the representative channel and the second is a channel handover to be performed within the handover target radio zone. For those reasons, in the conventional mobile communication system, a long time is required for performing the channel handover procedure consisting of a radio zone handover procedure and a channel handover procedure to be performed within that radio zone. On the other hand, another approach may be possible in which a base station notifies a mobile station of all channels for peripheral zones and the mobile station selects a specific channel among all channels notified so that the mobile station can switch the channel directly to the selected channel. However, this is not preferred because when the base station notifies the mobile station of all channels for the peripheral zones, the traffic of down channel from the base station to the mobile station is increased.

SUMMARY OF THE INVENTION

It is, therefore, an object of the present invention to provide a mobile communication system, a network and a mobile station, capable of reducing the time required for performing a channel handover procedure in the mobile communication system.

To achieve the above object, a mobile communication system according to the present invention, in which a radio communication is performed between a network having a plurality of radio zones and a mobile station, wherein, the network includes:

determining means for determining at least one candidate radio zone and at least one candidate channel (excepting a case where the number of the candidate radio zone and the candidate channel is both one) for handover; and notifying means for notifying the mobile station of the information determined by the determining means;

the mobile station includes:

information receiving means for receiving information from the notifying means in the network; and specifying means for specifying a single radio zone and a single channel for the radio zone, based on information received by the information receiving means.

In the conventional mobile communication system, when the mobile station changes its visiting zone, the base station notifies the mobile station of a single candidate radio zone and a channel. In the event a channel handover procedure results in failure due to effect of interference, etc., the mobile station receives a notice of a new single candidate radio zone and a channel once again from the base station. Thereafter, the mobile station performs the channel handover procedure all over again. On the other hand, in the mobile communication system according to the present invention, the mobile station receives information on a plurality of candidate radio zones and channels from the network. Accordingly, in the event the channel handover procedure results in failure, the mobile station can immediately try to perform a channel handover procedure with respect to each one of the candidate radio zones and channels already notified by the base station.

That is, it is not required for the mobile communication system according to the present invention to receive information on a new candidate radio zone and a channel once again from the base station, etc. even in the event the first channel handover procedure results in failure. This makes it possible for the mobile communication system according to the present invention to perform a handover procedure with respect to a radio zone and a channel at a higher speed than in the conventional mobile communication system.

It is preferred in the mobile communication system according to the present invention that the mobile station includes zone selecting means for selecting a candidate radio zone among all of the radio zones, and candidate zone notifying means for notifying the network of the candidate radio zone selected by the zone selecting means.

In the conventional mobile communication system, it is necessary to perform a channel handover procedure twice in order to switch the channel to new one. That is, it was customary that the mobile station receives a representative channel of a handover target zone from the base station. Based on this, the mobile station changes over the channel to the representative channel thus received. Then, the mobile station must perform the procedure for switching the channel to a certain channel within the radio zone which is assigned with the representative channel.

In the mobile communication system according to the present invention, the mobile station itself selects a candidate radio zone. Then, the mobile station notifies the network of the selected radio zone. Thereafter, the mobile station receives a response for allowing a channel handover to the selected radio zone, etc. from the network.

Accordingly, the mobile station can switch the radio channel by performing a channel handover procedure only once. That is, since the channel handover procedure is started after a handover target radio zone is specified and a handover target channel is specified in that target zone, the channel can be switched by performing a channel handover procedure only once. Owing to the foregoing features, the mobile communication system according to the present invention can perform a handover procedure with respect to a communication channel at a higher speed than the conventional mobile communication system.

DETAILED DESCRIPTION OF PREFERRED EMBODIMENTS

In order to make it easier to understand the present invention, several preferred embodiments of the invention will now be described with reference to the accompanying drawings. It should be noted, however, that the preferred embodiments herein described are not intended to be exhaustive or to limit the invention to the precise form disclosed, and that they are chosen and described to explain the principles of the invention and can, therefore, be appropriately be changed without departing from the scope of the invention.

A. First Embodiment

Figure 1:
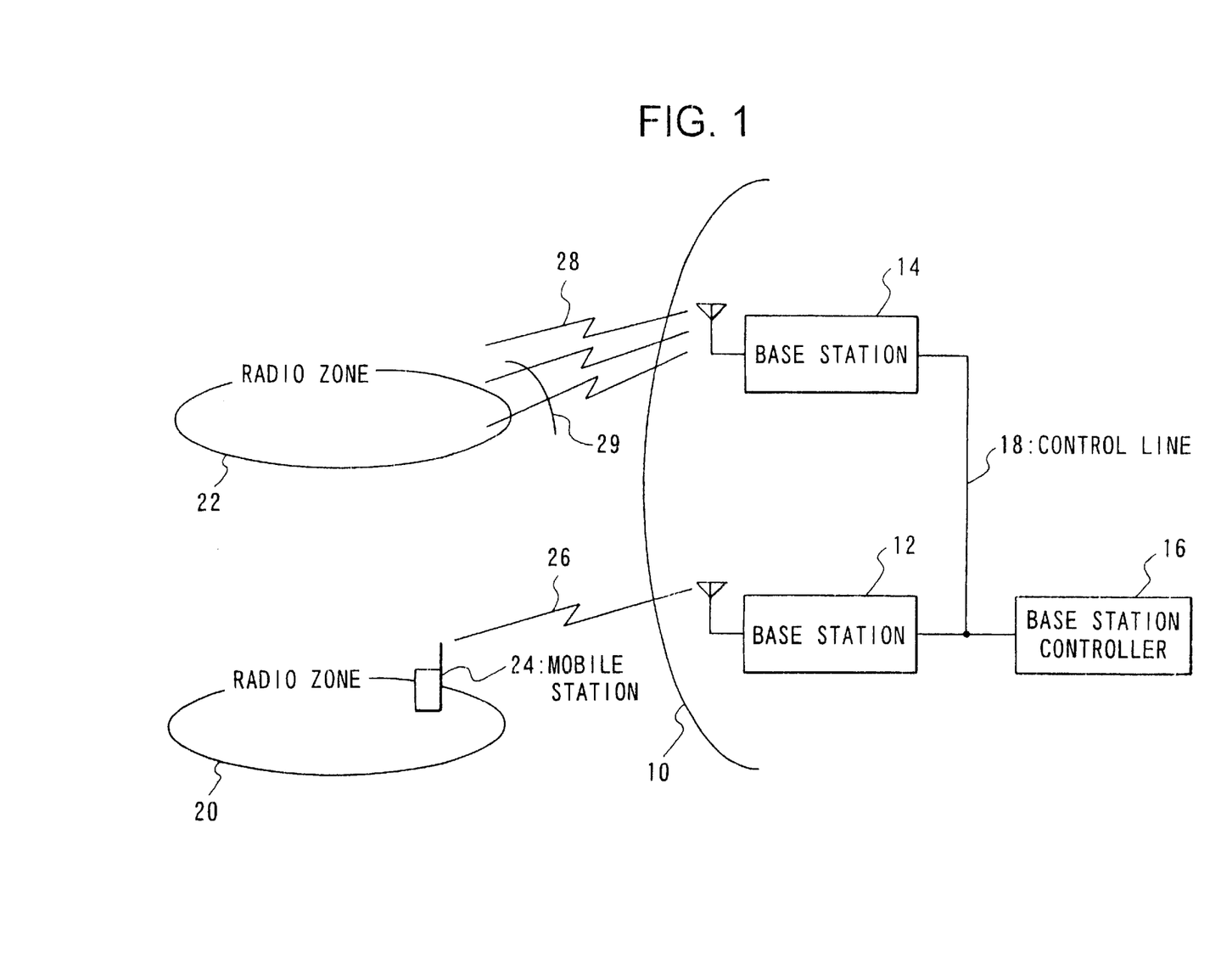
FIG. 1 is a block diagram showing a configuration of a mobile communication system according to the first embodiment of the present invention.

FIG. 1 is a block diagram showing one example of a configuration of a mobile communication system according to the first embodiment of the present invention. In FIG. 1, a network 10 includes a base station 12, another base station 14, a base station controller 16, and a control line 18. A radio zone 20 of the base station 12 is adjacent to a radio zone 22 of the base station 14.

The base station controller 16 controls the base stations 12 and 14 through the control line 18. A mobile station 24 is visiting the radio zone 20 and is in communication with the base station 12 through a radio communication channel 26. Also, in FIG. 1, reference numeral 28 denotes a representative channel of all radio communication channels of the base station 14, and reference numeral 29 denotes a radio communication channels group of the base station 14.

Figure 2:
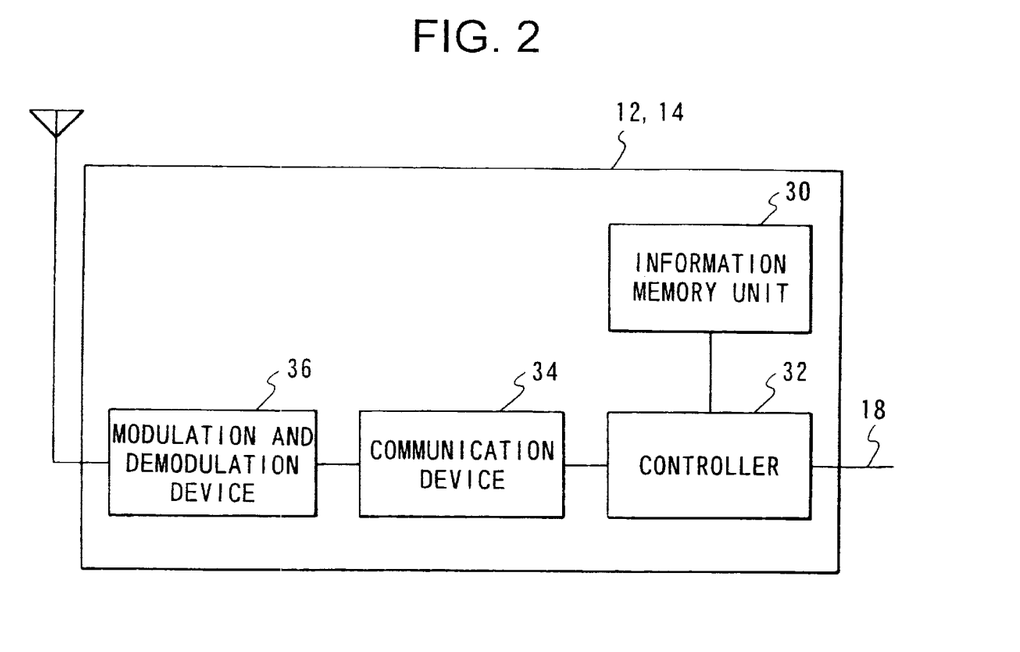
FIG. 2 is a block diagram showing configuration of the base station 12 (or 14) of FIG. 1.

FIG. 2 is a block diagram showing the configuration of the base station 12 (or 14) of FIG. 1. In FIG. 2, an information memory unit 30 stores information on mobile stations and base stations. A controller 32 establishes a signal message to be notified to the mobile station in accordance with the information stored in the memory unit 30. The controller 32 measures an utilization factor of each communication channel usable in its own zone and notifies the base station controller 16 of a result of the measurement through the control line 18. The base station controller 16 manages the utilization factor notified. A communication device 34 generates a signal for communication with the mobile station. A modulation and demodulation device 36 modulates the signal generated by the communication device 34 and sends it to the mobile station. Also, the device 36 demodulates a signal received from the mobile station.

Figure 3:
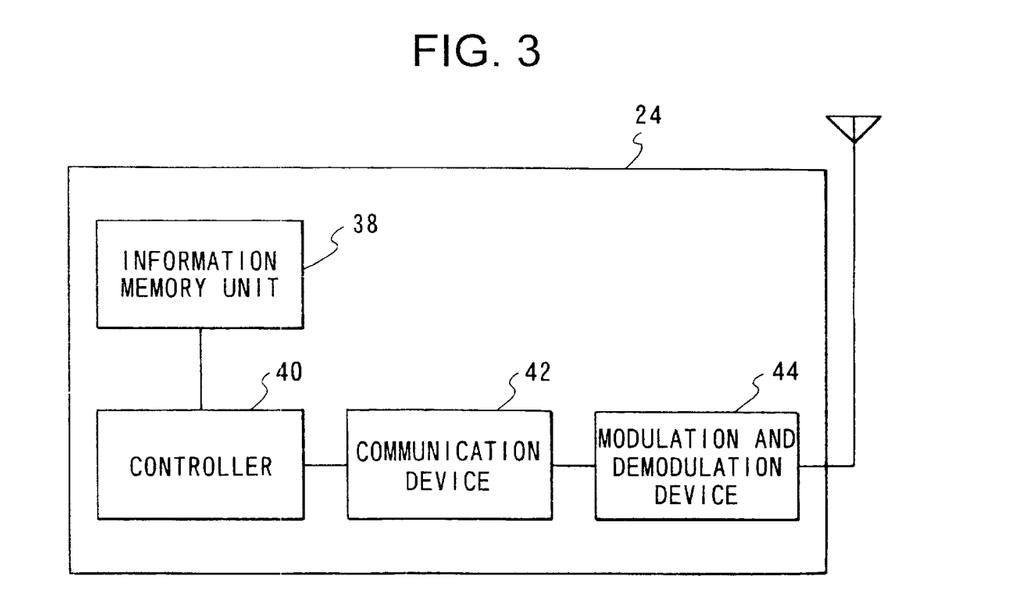
FIG. 3 is a block diagram showing a configuration of a mobile station 24 of FIG. 1.

FIG. 3 is a block diagram showing a configuration of the mobile station 24 of FIG. 1. In FIG. 3, an information memory unit 38 stores therein information on the mobile station and the base station. A controller 40 establishes a signal message to be notified to the base station in accordance with the information stored in the memory unit 38. A communication device 42 generates a signal for communication with the base station. A modulation and demodulation device 44 modulates the signal generated by the communication device 42 and sends it to the base station. Also, the device 44 demodulates a signal received from the base station.

Figure 4:
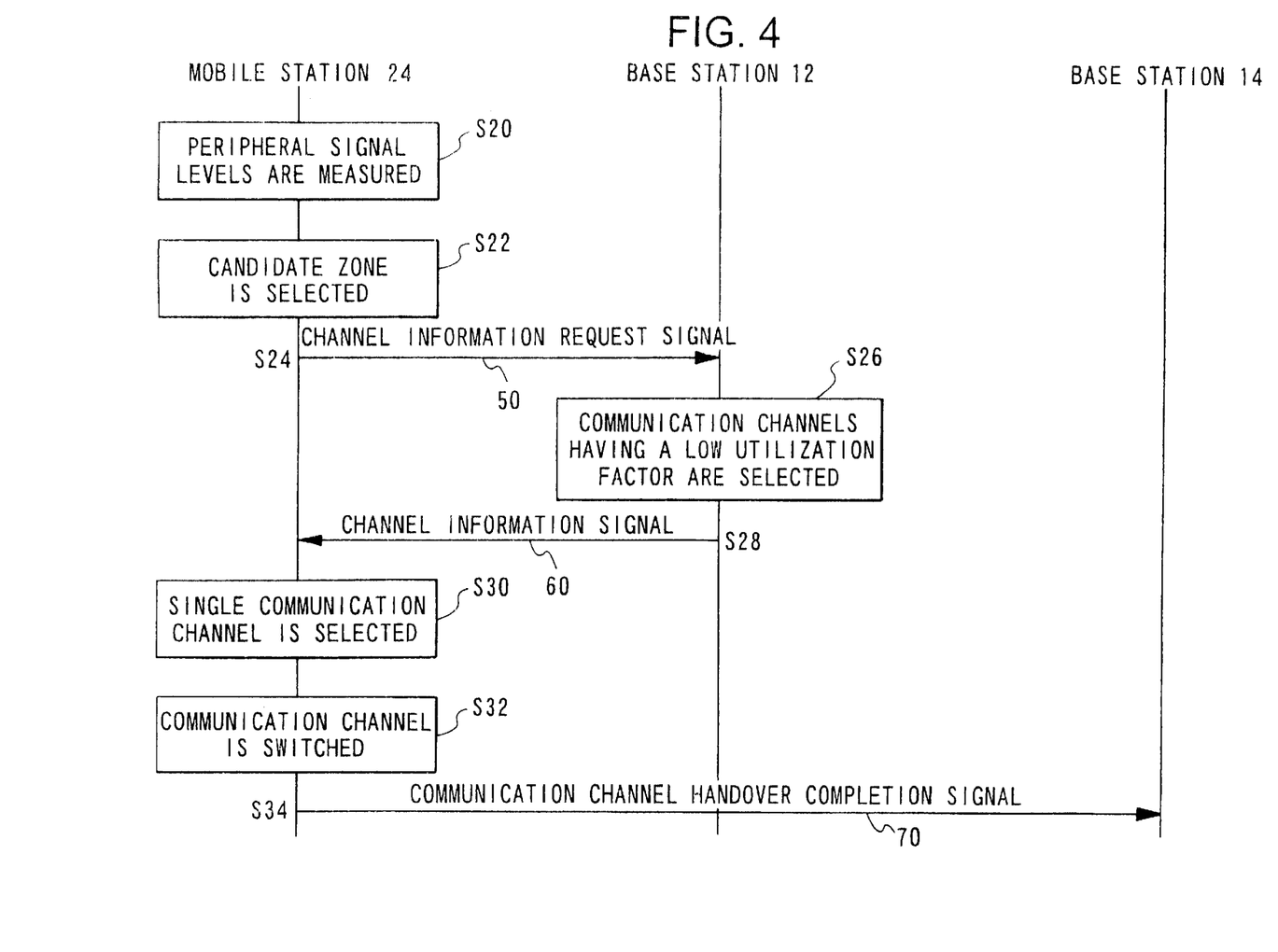
FIG. 4 is a sequence diagram showing communication sequences between the mobile station 24 and the base stations 12, 14 of FIG. 1.

FIG. 4 is a sequence diagram showing communication sequences between the mobile station 24 and the base station 12.

The mobile station 24, this being in communication with the base station 12, measures the signal level of a representative communication channel usable in each of the peripheral zones first, in order to leave the present zone for visiting a new zone (S20). Then, the mobile station 24 selects a zone having the highest signal level as a handover candidate, based on a result of the measurement (S22).

Thereafter, the mobile station 24 sends a channel information request signal 50 to the base station 12, in order to obtain channel information on the handover candidate zone (S24). Upon receipt of the channel information request signal 50, the base station 12 inquires of the base station controller 16 about the utilization factors of all communication channels usable in the designated handover candidate zone. The base station controller 16 notifies the base station 12 of the utilization factors of all communication channels usable in the designated handover candidate zone through the control line 18. The base station 12 selects communication channels having a utilization factor lower than a threshold preliminarily stored in the memory unit 30 among the communication channels notified by the base station controller 16 (S26). Then, the base station 12 notifies the mobile station 24 of the numbers of the selected communication channels by way of a channel information signal 60 (S28).

Figure 5:
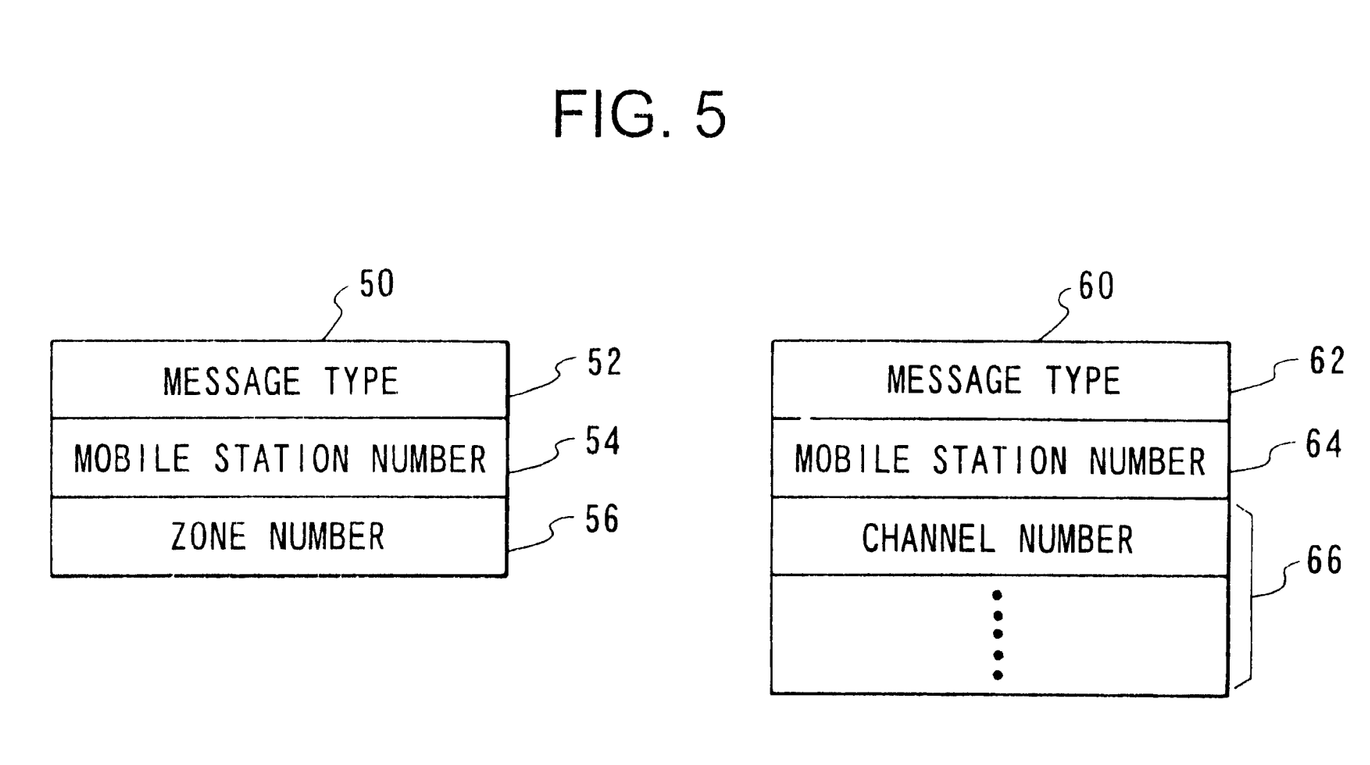
FIG. 5 is an explanatory view showing formats of a channel information request signal 50 and a channel information signal 60 of FIG. 4.

FIG. 5 shows formats of a channel information request signal and a channel information signal. The channel information request signal 50 includes "message type 52" indicating the type of a message, mobile station number "54" indicating the own number of the mobile station, and "zone number 56" indicating the number of the handover candidate zone. On the other hand, the channel information signal 60 includes "message type 62", "mobile station number 64" indicating the destination of a signal, and "channel number 66" indicating the numbers of a communication channels in the handover candidate zone.

Upon receipt of the channel information signal 60, the mobile station 24 selects one communication channel among all communication channels designated by the channel number 66 in the channel information signal 60 (S30). For example, one communication channel may be selected by using random numbers, or through numerical calculation using the mobile station number and the number of communication channels. Then, the mobile station 24 switches the communication channel to the selected one (S32). Thereafter, the mobile station 24 sends a communication channel handover completion signal 70 to the base station 14 which covers the handover target zone. By doing this, the handover procedure of communication channel is completed.

(Others)

Instead of the step (S26) for selecting communication channels of FIG. 4, the base station 12 may notify the mobile station 24 of the numbers of all communication channels usable in the designated handover candidate zone. This can reduce any load to the base station 12 caused by the handover procedure of communication channels.

In the step (S26) for selecting communication channels shown in FIG. 4, the base station 12 may select a predetermined number of communication channels which are lower in utilization factor. In that case, the mobile station 24 can precisely select those communication channels which are lower in utilization factor.

Because the communication channel can be switched by a single handover procedure according to this embodiment, a communication channel or channels can be switched at a higher speed than in the conventional mobile communication system. Further, since the base station 12 transmits only a handover target communication channel information instead of transmitting information on all peripheral zones, the otherwise heavy traffic in the down communication channels can be reduced. Moreover, since the base station 12 transmits a channel information signal only when it receives a channel information request signal from the mobile station 24, any load to the base station 12 and the heavy traffic in the down communication channels can be more reduced when compared with the conventional method where information on peripheral zones are periodically transmitted.

B. Second Embodiment

Figure 6:
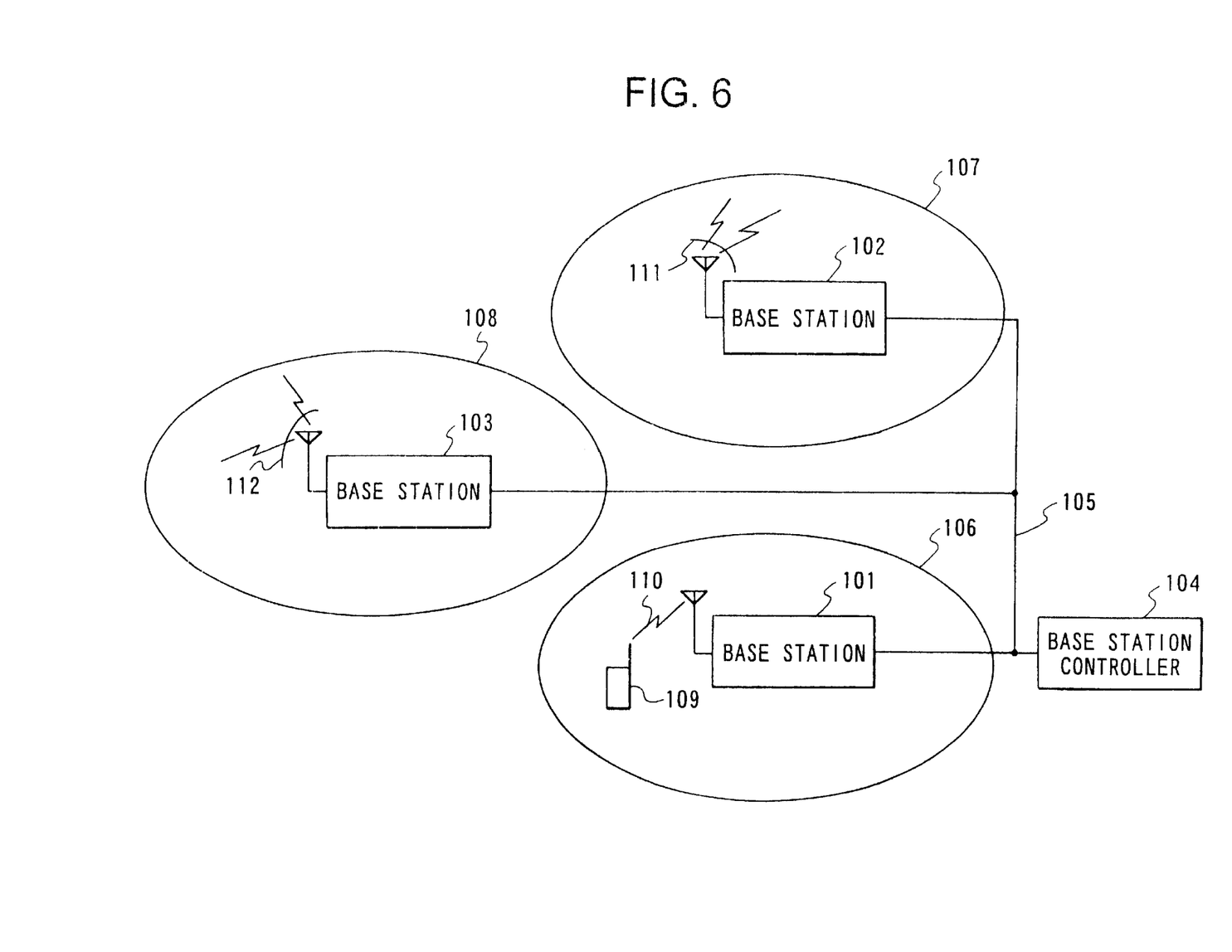
FIG. 6 is a block diagram showing a configuration of a mobile communication system according to the second embodiment of the present invention.

FIG. 6 is an explanatory view showing a configuration of a system according to the second embodiment of the present invention. In FIG. 6, base stations 101, 102 and 103 are located adjacent to one another. A base station controller 104 controls the base stations 101, 102 and 103. The base station controller 104 and the base stations 101, 102 and 103 mutually send and receive control signals through a control line 105. The base stations 101, 102 and 103 cover radio zones 106, 107 and 108, respectively. A mobile station 109 is currently visiting the radio zone 106 and is in communication with the base station 101 through the radio channel 110. Reference numeral 111 denotes a radio channels group of the base station 102, and reference numeral 112 denotes a radio channels group of the base station 103.

Figure 7:
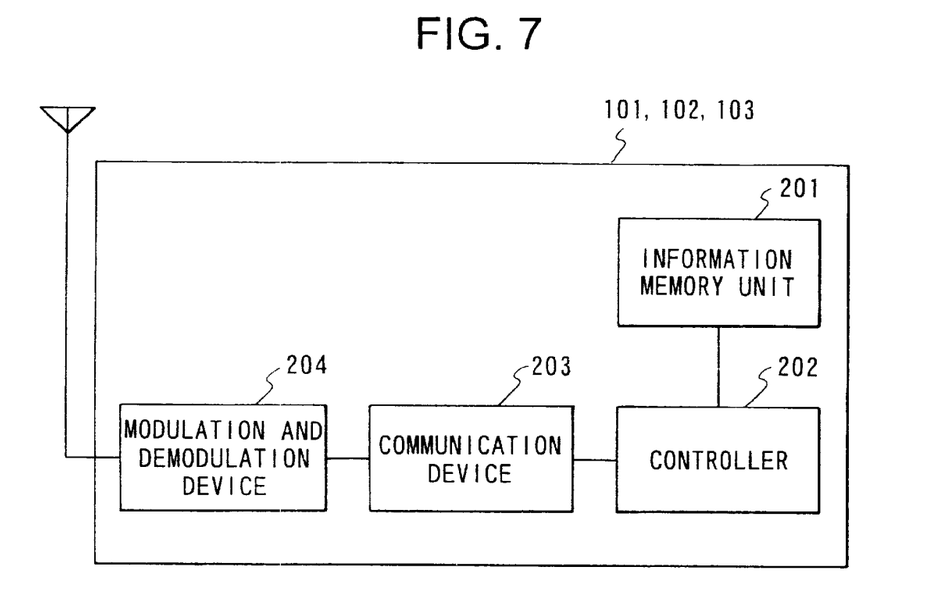
FIG. 7 is a block diagram showing a configuration of base station 101 (, 102 or 103) of FIG. 6.

FIG. 7 is a block diagram showing a configuration of the base station 101 (, 102 or 103) of FIG. 6. In FIG. 7, an information memory unit 201 stores therein information on the mobile station and the base station. A controller 202 establishes a signal message to be notified to the mobile station in accordance with the information stored in the memory unit 201. A communication device 203 generates a signal to be sent to the mobile station. A modulation and demodulation device 204 modulates the signal received from the communication device 203 and sends it to the mobile station through a radio channel. Also, the device 203 demodulates a signal received from the mobile station.

Figure 8:
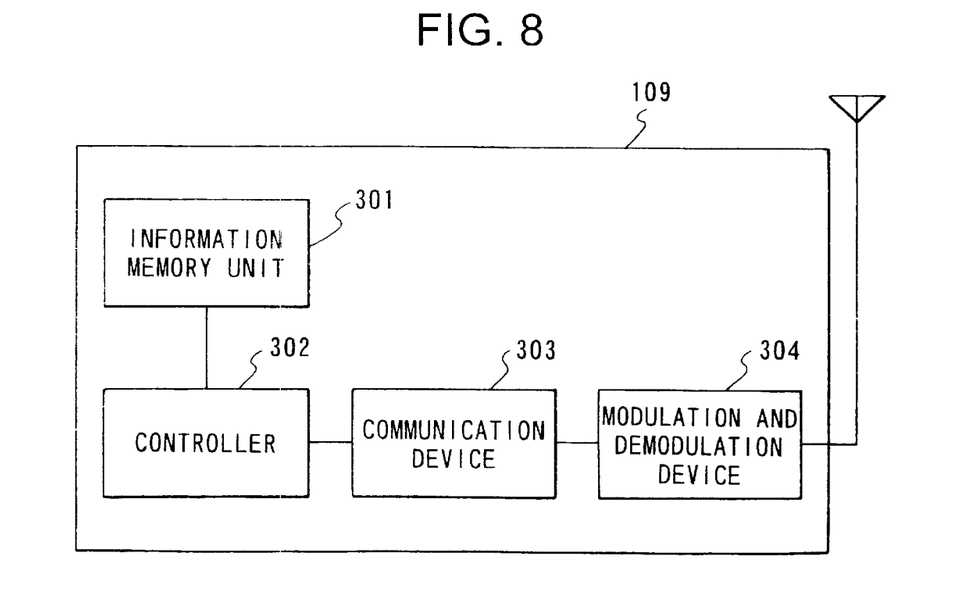
FIG. 8 is a block diagram showing a configuration of a mobile station 109 of FIG. 6.

FIG. 8 is a block diagram showing a configuration of the mobile station 109 of FIG. 6. In FIG. 8, an information memory unit 301 stores therein information on the mobile station and the base station. A controller 302 establishes a signal message to be notified to the base station in accordance with the information stored In the memory unit 301. A communication device 303 generates a signal to be sent to the base station. A modulation and demodulation device 304 modulates the signal received from the communication device 303 and sends it to the base station. Also, the device 304 demodulates a signal received from the base station.

Figure 9:
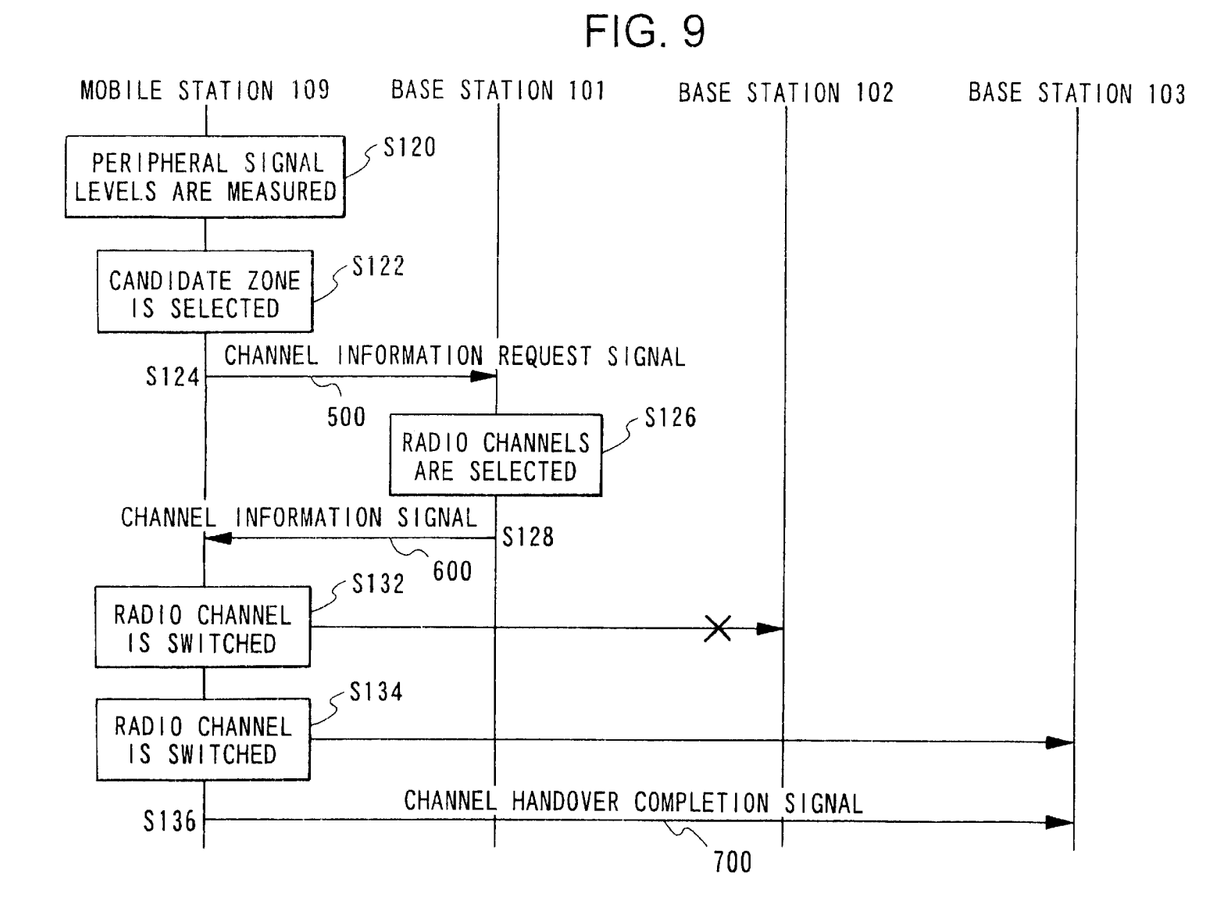
FIG. 9 is a sequence diagram showing communication sequences between the mobile station 109 and the base stations 101 through 103 when the radio zone is switched to another radio zone.

FIG. 9 is a sequence diagram showing communication sequences between the mobile station 109 and the base stations 101, 102 and 103 when the mobile station 109 switches the radio zone. The mobile station 109 measures the signal level of a representative communication channel usable in each of the peripheral zones, in order to leave the present zone for visiting a new zone (S120). Then, the mobile station 109 selects zones having a comparatively high level of a representative radio channel as handover candidate zones (S122). Thereafter, the mobile station 109 sends a channel information request signal including the radio zone numbers of the selected candidate zones to the base station 101, with which the mobile station 109 is in communication (S124).

Figure 10:
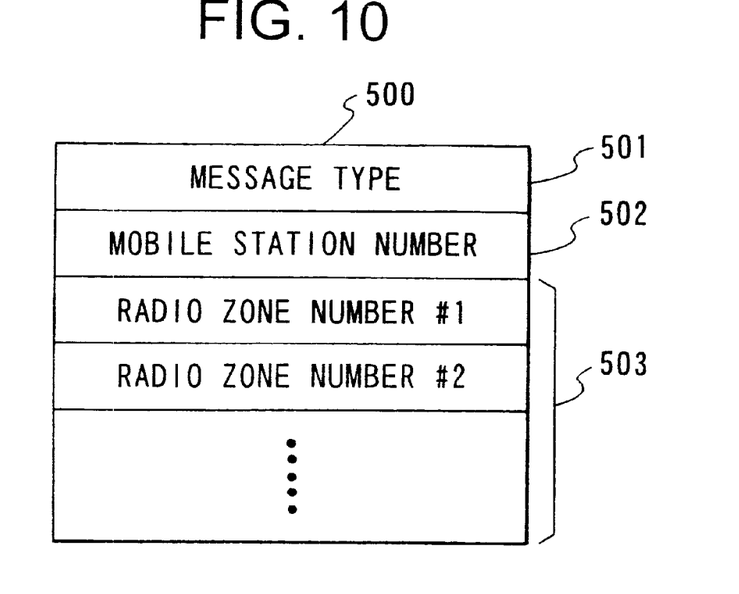
FIG. 10 is an explanatory view showing a format of a channel information request signal 500 of FIG. 9.

FIG. 10 shows a format of a channel information request signal 500. The channel information request signal 500 includes "message type 501", "mobile station number 502" as a transmitter, and "radio zone number 503" indicating the numbers of the handover candidate zones. The radio zone numbers usable in a plurality of candidate zones are sorted in order of higher reception signal level.

The base station 101 selects a predetermined number of radio zones having a comparatively high reception signal level among all radio zones designated by the channel information request signal received. Then, the base station 101 selects a single radio channel for each selected radio zone (S126 of FIG. 9). Thereafter, the base station 101 generates a channel information signal 600 including "radio zone number" and "radio channel number" and sends it (S128).

Figure 11:
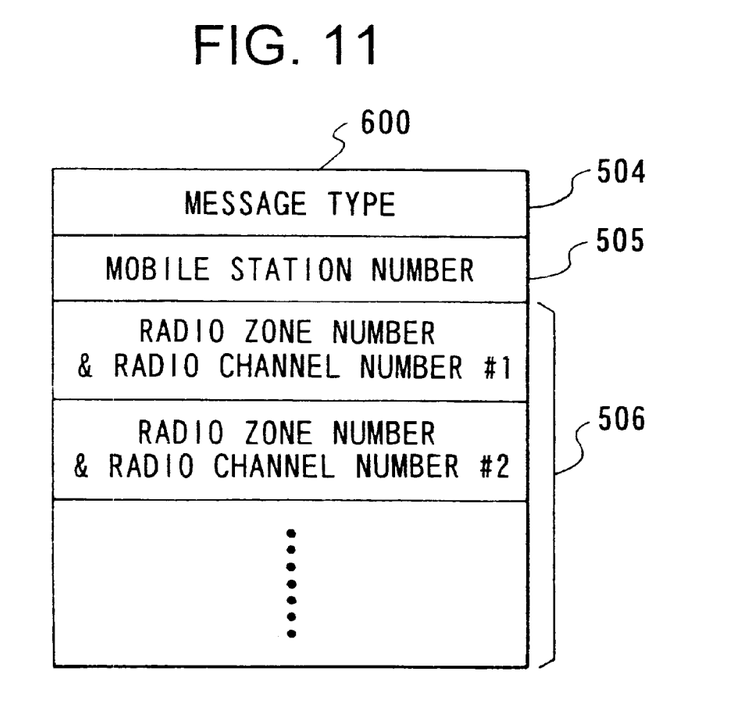
FIG. 11 is an explanatory view showing a format of a channel information signal 600 of FIG. 9.

FIG. 11 shows a format of the channel information signal 600. The channel information signal 600 includes "message type 504", "mobile station number 505" as a receiver, and "candidate radio zone number and radio channel number (which is designated by the base station in each radio zone) 506". The radio zone number and the radio channel number 506 are sorted in order of higher reception signal level in the mobile station 109.

The mobile station 109 selects the radio channel usable in the first radio zone among all candidate radio zones designated by the channel information signal 600, and attempts to connect to the selected radio channel (S132 of FIG. 9). When the attempt for connection results in failure, the mobile station 109 then attempts to connect to the radio channel of the next radio zone designated by the channel information signal 600 (S134). The mobile station 109 continues its attempt for connection until the connection is successfully achieved. When the connection is successfully achieved, the mobile station 109 sends a channel handover completion signal 70 to the base station 103 that covers the candidate zone, thereby completing the radio channel connection (S136).

According to this embodiment, even if the attempt for radio channel connection results in failure, there is no need for the mobile station to receive information on an additional handover target radio channel again from the base station. Accordingly, the radio channel can be switched at a high speed.

(Others)

Upon receipt of the channel information request signal, the base station 101 may select a plurality of radio channels for each radio zone and notify the mobile station of the selected radio channels. In this case, the mobile station can determines a radio channel to be connected among a larger number of radio channels.

In the above embodiment, the mobile station measures the peripheral signal levels and notifies the network of the measurement result. It is also an interesting alternative that the network is equipped with a receiver for monitoring the mobile station so that the network can select an appropriate radio zone by measuring the status of the peripheral zones of the mobile station. In the above embodiment, upon receipt of the channel information request signal, the base station generates a channel information signal and selects a radio channel. In the alternative, the base station controller may perform the same procedure.

C. Third Embodiment

Figure 12:
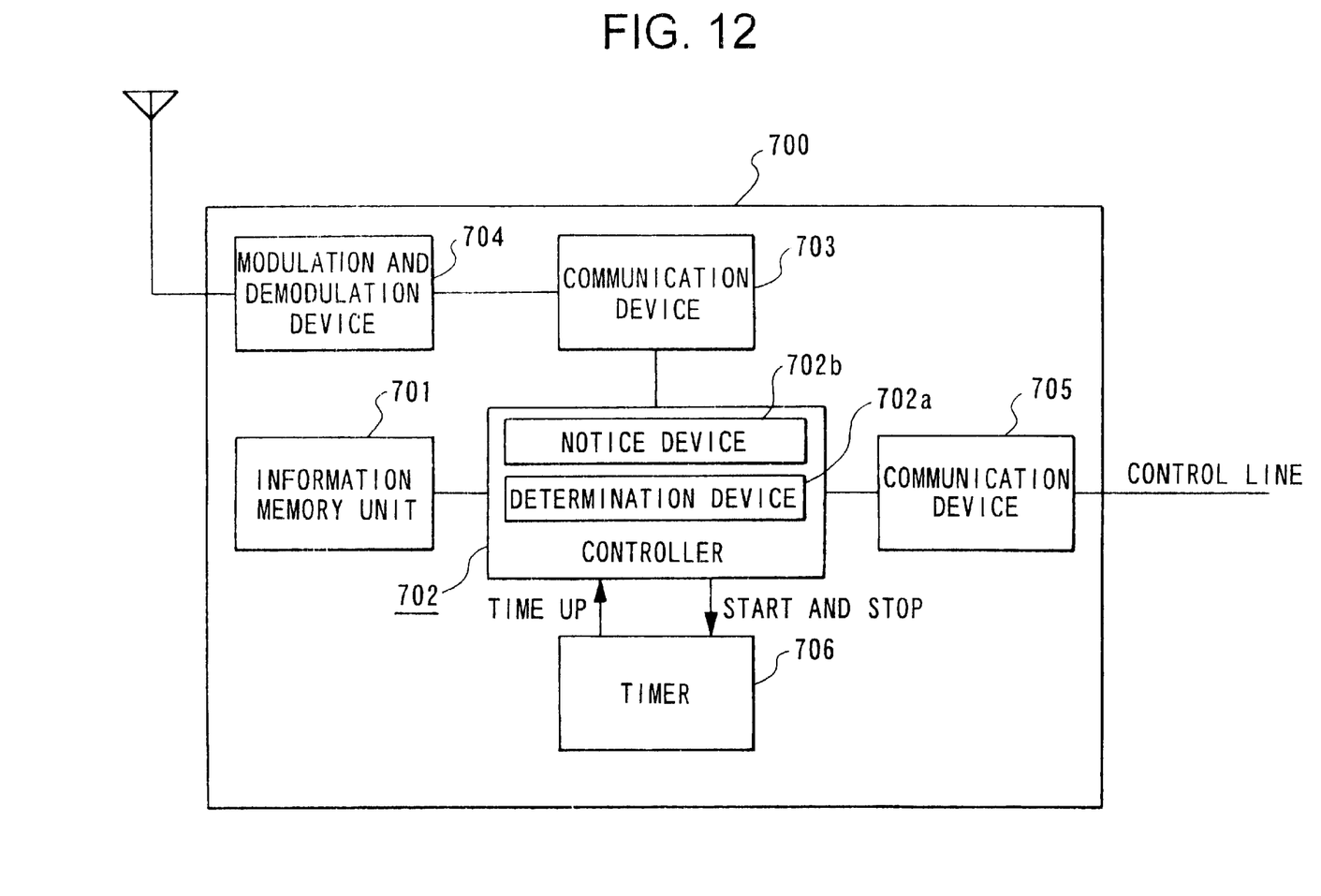
FIG. 12 is a block diagram showing a configuration of a base station in a mobile communication system according to the third embodiment of the present invention.

FIG. 12 is a block diagram showing a configuration of a base station in a radio mobile communication system according to the third embodiment of the present invention. In a base station 708 of FIG. 12, an information memory unit 701 stores therein information on the mobile station and the base station. A controller 702 controls the operation of the overall base station 708. The controller 702 includes a determination device 702a and a notice device 702b. The determination device 702a determines a plurality of candidate radio zones and channels when the mobile station performs a channel handover procedure. And the determination device 702a causes the information memory unit 701 to store therein information on the candidate radio zones and channels determined by the device 702a. The notice device 702b accesses the information on the candidate radio zones and channels stored in the information memory unit and delivers the information to a communication device 703.

The communication device 703 converts the information received from the notice device 702b into a signal to be sent to the mobile station. A modulation and demodulation device 704 modulates the signal received from the communication device 703 and transmits the modulated signal to the mobile station through a radio channel. Also, the modulation and demodulation device 704 demodulates the signal received from the mobile station. A communication device 705 communicates with other base stations through a control line. A timer 706 is controlled by the controller 702 and measures the time for holding the channel, etc. in the channel handover procedure.

Figure 13:
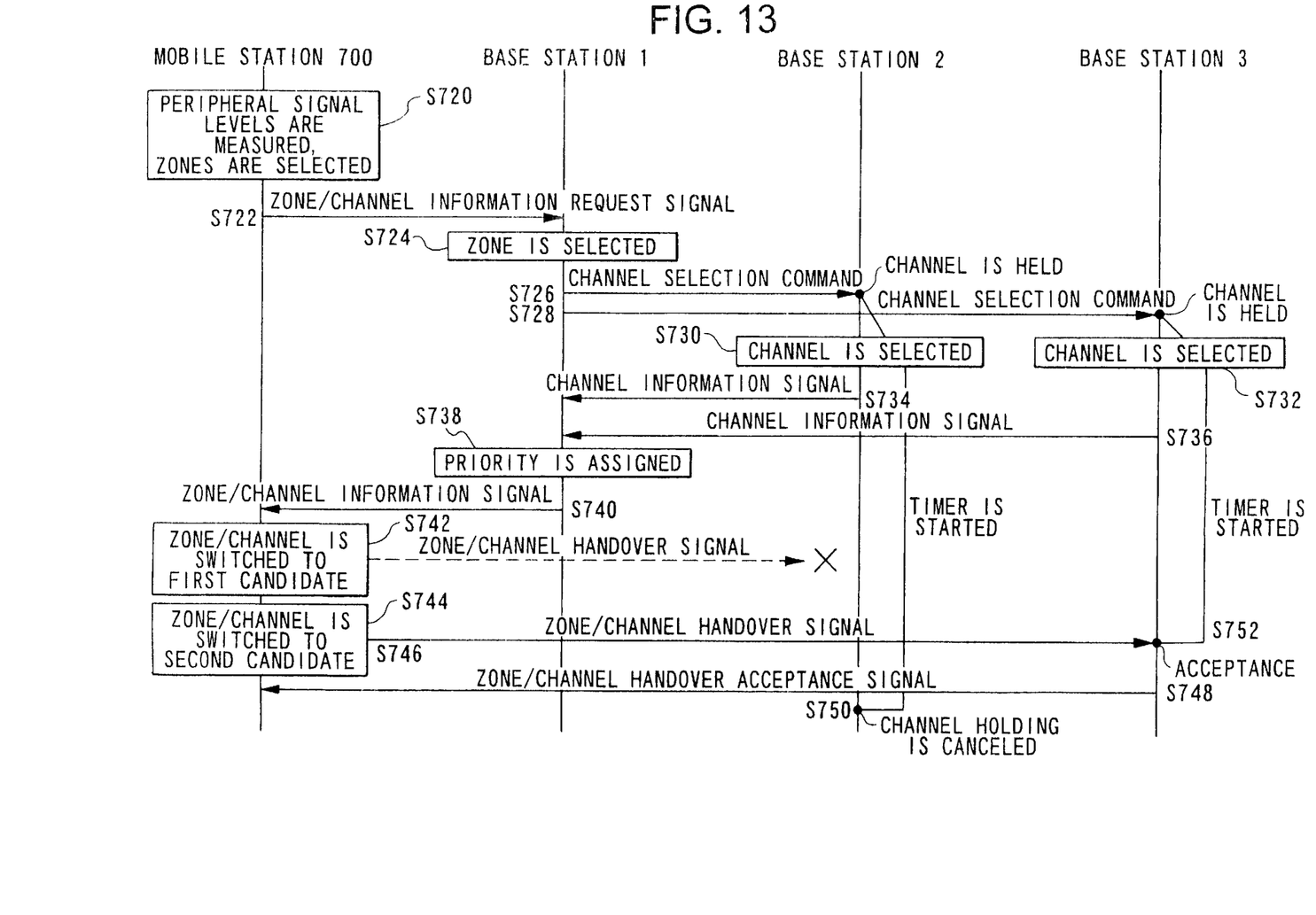
FIG. 13 is a sequence diagram showing a channel handover procedure in the mobile communication system according to the third embodiment of the present invention.

FIG. 13 is a sequence diagram showing a channel handover procedure in the radio mobile communication system according to this embodiment. That is, FIG. 13 is a sequence diagram showing a communication sequence when the mobile station 700 switches the radio zone from the radio zone covered by the base station 1 to the radio zone covered by base station 2 or 3.

First, when the mobile station 700 is going to visit another radio zone, it measures the reception signal level of each representative radio channel for a plurality of peripheral radio zones (S720). Then, the mobile station 700 selects a plurality of radio zones having a representative radio channel whose signal level is high, as candidates (S720). It should be noted that a plurality of candidate radio zones are selected here. Subsequently, the mobile station 700 sends a channel information request signal including the selected candidate radio zone numbers to the base station 1 which is currently in communication with the mobile station 700 (S722).

Figure 14:
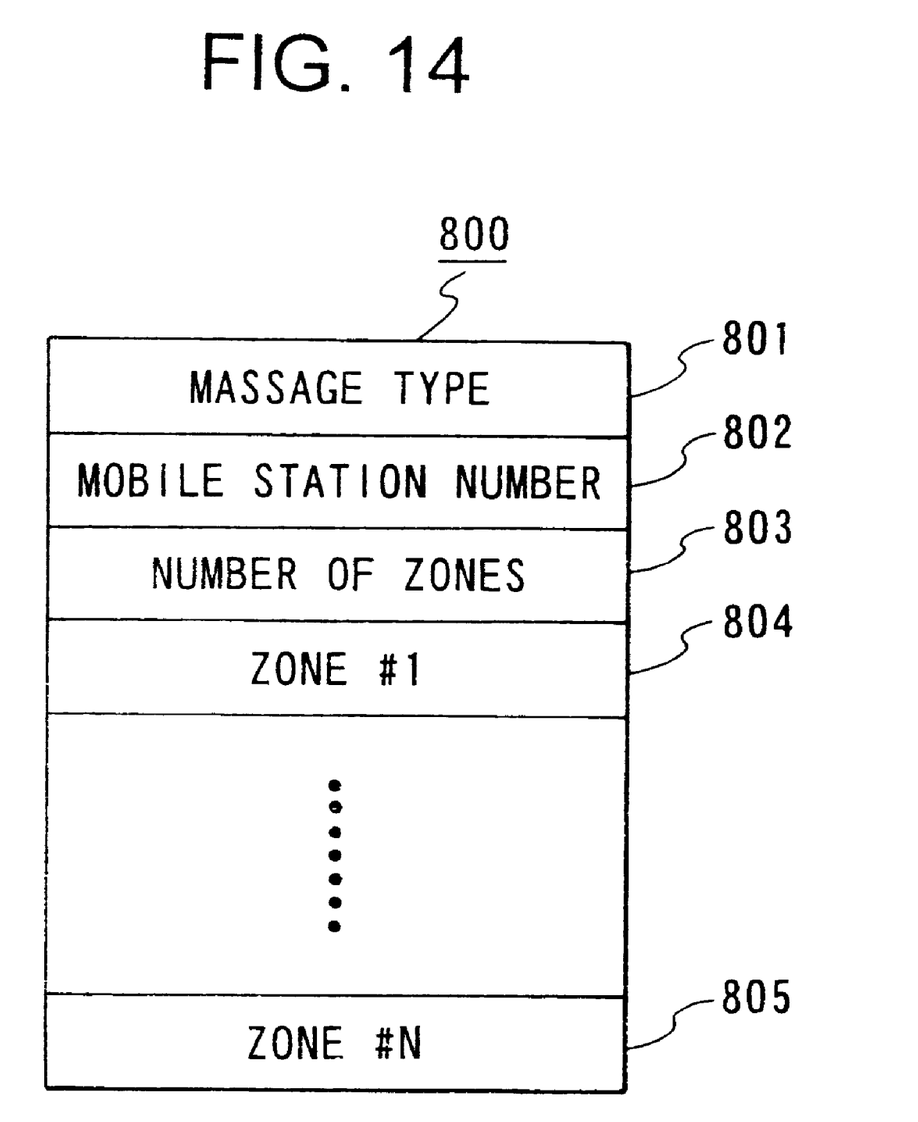
FIG. 14 is an explanatory view showing a format of a zone/channel information request signal.

FIG. 14 shows a format of a zone/channel information request signal 800. The zone/channel information request signal 800 includes "message type 801", "mobile station number 802 (transmitter)", "number of zones 803", "zone number 804,,,805". It should be noted here that the number of zones 803 refers to the number of candidate radio zones, i.e., the number of zones shown from zone number 804 to zone number 805.

In FIG. 13, the determination device 702a in the base station 1 selects a predetermined number of radio zones whose reception signal level is high, among all radio zones designated by the received channel information request signal (S724). Here, the determination device 702a may select those radio zones whose channel utilization factor is low, in preference to others. And the notice device 702b in the base station 1 sends channel selection commands each to the base stations 2 and 3 which cover the radio zones selected by the determination device 702a (S726, S728). Upon receipt of the channel selection commands, the base stations 2 and 3 select a plurality of candidate channels, respectively (S730, S732) and at the same time, cause the timer 706 to be started so that the selected channels are held for a predetermined time interval (S750, S752). This makes it possible to prohibit other mobile stations from using the channels in their holding states. Then, the base stations 2 and 3 send channel information signals including information on the selected channels to the base station 1 (S734, S736).

The base station 1 decides the order of priority for the candidate zones/channels base on the received channel information signals (S738). Then, the base station 1 sends an information signal on the selected candidate zones/channels which are decided the order of priority, to the mobile station 700 (S740).

Figure 15:
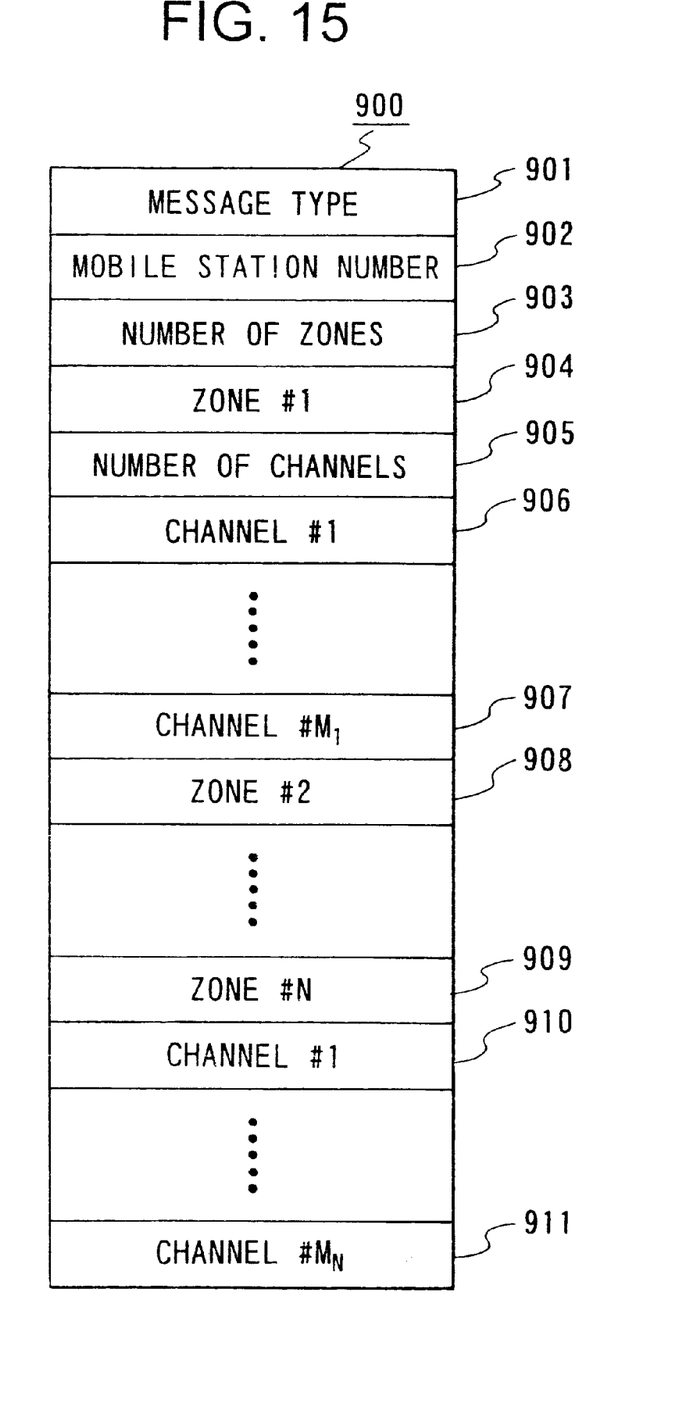
FIG. 15 is an explanatory view showing a format of a zone/channel information signal.

FIG. 15 shows a format of a zone/channel information signal 900. The zone/channel information signal 900 includes "message type 901", "mobile station number 902", "number of zones 903", "zone numbers 904, 908 and 909", "number of channels 905", and "channel numbers 906, 907, 910 and 911". It should be noted here that the number of zones 903 refers to information indicating the number of candidate radio zones. That is, in this format, it includes a plurality of candidate radio zones. And each radio zone number includes a plurality of channel numbers. It should also be noted here that the number of channels refers to the number of the "number of channels" which are designated for each radio zone. Here, the individual radio zone numbers are sorted in order of higher reception signal level or lower channel utilization factor.

The mobile station 700 selects the first candidate radio zone and the first candidate radio channel which are designated by the information signal (S740). Then, the mobile station 700 attempts to connect to a radio channel for the selected radio zone (S742). If the attempt for connection results in failure, the mobile station 700 makes another attempt (S744) to connect to the next candidate radio zone and radio channel which are designated by the information signal (S740). The mobile station 700 continues this connection attempt to the subsequent radio zones and radio channels until the connection is successfully achieved. When the connection is successfully achieved, that is, when the zone/channel handover signal is received by the base station 3 (S746), the base station 3 stops the holding by the timer 706. At the same time, the base station 3 sends a zone/channel handover acceptance signal to the mobile station 700 (S748). By this, the radio zone/channel handover procedure is completed.

In the above embodiment, a plurality of radio zones and channels are held using the timer 706. It should be noted, however, that the present invention is by no means limited to this. For example, it may be designed such that in case a plurality of base stations hold a certain channel upon receipt of a channel selection command, those base stations cancel the holding of the channel when they receive a signal for canceling the holding from the specific other base station that has successfully performed the channel handover procedure.

According to this embodiment, the base station notifies the mobile station of a plurality of candidate radio zones and channels. Based on this notice, the mobile station performs a channel handover procedure. When the channel handover procedure results in failure, the mobile station performs a channel handover procedure again with respect to another radio zone and channel among those radio zones and channels already notified, without a need of receiving another notice from the base station. That is, even if the connection procedure of the radio channel of the first candidate results in failure, the mobile station is not required to receive information on another candidate radio channel again from the base station because the radio zones and channels of from the second candidate on are already held by the timer, etc. For this reason, the mobile communication system according to this embodiment can switch a radio zone and a channel at a comparatively high speed.

What is claimed is:

1. A method for determining a next radio communication channel for a mobile station to maintain a continuing communication with a fixed network, the fixed network including a plurality of base stations each forming a radio zone respectively in a mobile communication system, comprising the steps of:

designating in the mobile station, at least one radio zone as a candidate(s) from among radio zones peripheral to a radio zone in which the mobile station is located;

transmitting information indicating the designated at least one candidate radio zone, from the mobile station to the fixed network;

selecting in the network, at least one radio zone from the designated candidate radio zones and at least one candidate channel for each selected one of the designated candidate radio zones;

transmitting information indicating a plurality of selected candidate channels, from the network to the mobile station; and determining in the mobile station, the next channel from the plurality of selected candidate channels for continuing a communication between the mobile station and the network as the mobile station travels from one radio zone to another.

2. The method for changing a radio communication channel between a mobile station and a fixed network according to claim 1, wherein the information transmitted from the network includes for each selected candidate channel a corresponding radio zone for determining the next radio zone and the next channel.

3. The method for changing a radio communication channel between a mobile station and a fixed network according to claim 2, further comprising the step of arranging in the network the selected candidate channels and corresponding radio zones in order of priority.

4. The method for changing a radio communication channel between a mobile station and a fixed network according to claim 3, wherein the order of priority is based on signal level.

5. The method for changing a radio communication channel between a mobile station and a fixed network according to claim 3, wherein the order of priority is based on utilization level.

6. The method for changing a radio communication channel between a mobile station and a fixed network according to claim 3, wherein the step of determining in the mobile station the next radio zone and the next channel for continuing a communication, includes the step of attempting a connection to each of the selected candidate channels in sequence in order of priority until a successful connection is achieved.

7. A method for changing a radio communication channel between a mobile station and a fixed network, the fixed network including a plurality of base stations each forming a radio zone respectively in a mobile communication system, comprising the steps of:

designating in the mobile station, at least one radio zone as a candidate(s) for determining a next radio zone;

transmitting information indicating the designated at least one candidate radio zone, from the mobile station to a first base station;

sending a signal from the first base station to at least one second base station forming the designated at least one candidate radio zone, the signal requesting a selection of at least one candidate channel for the designated at least one candidate radio zone;

selecting in each of the at least one second base station in response to the signal from the first base station, at least one candidate channel for determining a next channel;

sending information from each of the at least one second base station to the first base station identifying the selected at least one candidate channel;

transmitting information indicating a plurality of selected candidate channels, from the first base station to the mobile station; and determining in the mobile station, the next radio zone and the next channel for continuing a communication on the bases of the information transmitted from the first base station indicating a plurality of selected candidate channels.

8. The method for changing a radio communication channel between a mobile station and a fixed network according to claim 7, wherein the information transmitted from the first base station includes for each selected candidate channel a corresponding radio zone for determining the next radio zone and the next channel.

9. The method for changing a radio communication channel between a mobile station and a fixed network according to claim 8, further comprising the step of arranging in the first base station the selected candidate channels and corresponding radio zones in order of priority.

10. The method for changing a radio communication channel between a mobile station and a fixed network according to claim 9, wherein the order of priority is based on signal level.

11. The method for changing a radio communication channel between a mobile station and a fixed network according to claim 9, wherein the order of priority is based on utilization level.

12. The method for changing a radio communication channel between a mobile station and a fixed network according to claim 9, wherein the step of determining in the mobile station the next radio zone and the next channel for continuing a communication, includes the step of attempting a connection to each of the selected candidate channels in sequence in order of priority until a successful connection is achieved.

13. The method for changing a radio communication channel between a mobile station and a fixed network according to claim 7, wherein said information indicating a plurality of selected candidate channels includes information indicating the priority among the selected candidate channels, and said mobile station decides the next channel on the basis of said information indicating priority.

14. A network which includes a plurality of base stations each forming a radio zone respectively and communicating with mobile stations over the air, comprising:

a receiver, receiving from a mobile station information which indicates at least one radio zone designated as a candidate(s) from among radio zones peripheral to a radio zone in which the mobile station is located;

a selector, selecting at least one radio zone from the designated candidate radio zones and at least one candidate channel for each selected one of the designated candidate radio zones; and a transmitter, sending information to the mobile station indicating a plurality of candidate channels from which the mobile station is going to choose a next communication channel for continuing a communication with the mobile station as the mobile station travels from one radio zone to another.

15. A mobile station communicating over the air with a network which includes a plurality of base stations each forming a radio zone respectively, comprising:

a selector, selecting at least one radio zone designated as a candidate(s) from among radio zones peripheral to a radio zone in which the mobile station is located;

a receiver, receiving the information sent from the network indicating a plurality of candidate channels for determining a next communication channel, at least one candidate channel being selected for each radio zone selected in the network from the at least one candidate radio zone; and a processor for determining the next communication channel from the plurality of candidate channels for continuing a communication with the network as the mobile station travels from one radio zone to another.

16. A network which includes a plurality of base stations each forming a radio zone respectively and communicating with mobile stations over the air, comprising:

a receiver in a first base station, receiving information sent by a mobile station which indicates at least one radio zone selected as a candidate(s) for determining a next radio zone;

a first transmitter in the first base station, sending a signal to at least one second base station forming the selected at least one radio zone which instructs each of the at least one second base station to select at least one candidate channel for a next channel;

a selector in each of the at least one second base station responsive to the signal transmitted by the first transmitter, selecting at least one candidate channel for determining the next channel;

a second transmitter in each of the at least one second base station, sending information indicating the at least one selected candidate channel to the first base station; and a third transmitter in the first base station, sending information to the mobile station indicating a plurality of candidate channels for determining a next communication channel.

17. A mobile station communicating over the air with a network which includes a plurality of base stations each forming a radio zone respectively, comprising:

a selector, selecting at least one radio zone designated as a candidate(s) from among radio zones peripheral to a radio zone in which the mobile station is located;

a receiver, receiving information sent from a base station indicating a plurality of candidate channels for determining a next communication channel, at least one candidate channel being selected for each radio zone selected in the network from the at least one candidate radio zone; and a processor for determining the next communication channel from the plurality of candidate channels for continuing a communication with the network as the mobile station travels from one radio zone to another.

18. A method for determining a next radio communication channel for a mobile station to maintain a continuing communication with a fixed network, the fixed network including a plurality of base stations each forming a radio zone respectively in a mobile communication system, the method comprising the steps of:

designating in the mobile station, at least one radio zone as a candidate(s) from among radio zones peripheral to a radio zone in which the mobile station is located;

transmitting information indicating the designated at least one candidate radio zone, from the mobile station to the fixed network;

selecting in the network, at least one radio zone from the designated candidate radio zones and at least one candidate channel for each selected one of the designated candidate radio zones;

transmitting information indicating a plurality of selected candidate channels, from the network to the mobile station; and attempting in the mobile station a connection to each of the selected candidate channels in sequence until a successful connection is achieved in order to determine the next communication channel for continuing a communication between the mobile station and the network as the mobile station travels from one radio zone to another.

19. A mobile station communicating over the air with a network which includes a plurality of base stations each forming a radio zone respectively, comprising:

a selector, selecting at least one radio zone designated as a candidate(s) from among radio zones peripheral to a radio zone in which the mobile station is located;

a receiver, receiving information sent from the network indicating a plurality of candidate channels for determining a next communication channel, at least one candidate channel being selected for each radio zone selected in the network from the candidate radio zones; and a processor for attempting a connection to each of the selected candidate channels in sequence until a successful connection is achieved in order to determine the next communication channel for continuing a communication with the network as the mobile station travels from one radio zone to another.

20. A mobile station communicating over the air with a network which includes a plurality of base stations each forming a radio zone respectively, comprising:

a selector, selecting at least one radio zone as a candidate (s) for determining a next radio zone among radio zones peripheral to the current radio zone in which the mobile station is located;

a receiver, receiving from the base station forming the current radio zone information indicating a plurality of candidate channels for determining a next communication channel, at least one candidate channel being selected for each radio zone selected in the network from the at least one candidate radio zone; and a processor for attempting a connection to each of the selected candidate channels in sequence until a successful connection is achieved in order to determine the next communication channel from the plurality of candidate channels for continuing a communication with the network as the mobile station travels from one radio zone to another.

* * * * *